United States Patent

Song

[11] Patent Number: 5,956,395
[45] Date of Patent: Sep. 21, 1999

[54] AUTOMATIC REDIAL METHOD FOR TELEPHONE SWITCHING SYSTEM

[75] Inventor: Chang-Young Song, Seoul, Rep. of Korea

[73] Assignee: SamSung Electronics Co., Ltd., Suwon, Rep. of Korea

[21] Appl. No.: 08/885,992

[22] Filed: Jun. 30, 1997

[30] Foreign Application Priority Data

Jun. 29, 1996 [KR] Rep. of Korea ........................ 96 26423

[51] Int. Cl.[6] .................................................. H04M 3/42
[52] U.S. Cl. ............................ 379/209; 379/157; 379/356
[58] Field of Search ..................................... 379/209, 354, 379/355, 356, 387, 216, 242, 196, 197, 198, 157, 156

[56] References Cited

U.S. PATENT DOCUMENTS

| | | | |
|---|---|---|---|
| 3,355,555 | 11/1967 | Thelemaque | 379/209 |
| 3,889,068 | 6/1975 | Dellecker | 379/209 |
| 4,113,991 | 9/1978 | Gorham et al. | 379/209 |
| 4,119,810 | 10/1978 | Marin et al. . | |
| 4,324,954 | 4/1982 | Taylor . | |
| 4,508,939 | 4/1985 | Lawson et al. . | |
| 4,602,128 | 7/1986 | Freundlich . | |
| 4,860,349 | 8/1989 | Brown | 379/355 |
| 4,887,294 | 12/1989 | Ruey-Guang . | |
| 4,930,155 | 5/1990 | Kurokawa . | |
| 5,136,637 | 8/1992 | Rust et al . | |
| 5,151,933 | 9/1992 | Abe | 379/209 |
| 5,153,908 | 10/1992 | Kakizawa et al. | 379/209 |
| 5,166,975 | 11/1992 | Maei | 379/209 |
| 5,243,646 | 9/1993 | McCarthy . | |
| 5,247,572 | 9/1993 | Koma . | |
| 5,268,959 | 12/1993 | Hong . | |
| 5,303,301 | 4/1994 | Takahata | 379/209 |
| 5,392,340 | 2/1995 | Otsuka . | |
| 5,394,462 | 2/1995 | Maemura . | |
| 5,590,183 | 12/1996 | Yoneda et al. | 379/209 |
| 5,689,557 | 11/1997 | Kaplan | 379/209 |
| 5,742,674 | 4/1998 | Jain et al. | 379/209 |

*Primary Examiner*—Scott Wolinsky
*Attorney, Agent, or Firm*—Robert E. Bushnell, Esq.

[57] ABSTRACT

A telephone switching system capable of enabling an individualized subscriber phone set of a calling subscriber to dial a stored telephone number, and if a called line of the stored telephone number is busy, to automatically redial the same telephone number at fixed intervals until a ring tone is obtained from the called line of the stored telephone number or until after the telephone number has been redialed a predetermined number of times even when a telephone handset of the subscriber phone set remains "on" hook.

19 Claims, 4 Drawing Sheets

AUTOMATIC REDIAL METHOD FOR TELEPHONE SWITCHING SYSTEM

CLAIM OF PRIORITY

This application makes reference to, incorporates the same herein, and claims all benefits accruing under 35 U.S.C. §119 from an application for AUTOMATIC REDIAL METHOD FOR TELEPHONE SWITCHING SYSTEM earlier filed in the Korean Industrial Property Office on the $29^{th}$ day of June 1996 and there duly assigned Serial No. 26423/1996, a copy of which application is annexed hereto.

BACKGROUND OF THE INVENTION

1. Field of the Invention

The present invention relates to a telephone switching system having a redialing feature, and more particularly, relates to a telephone switching system having software incorporated therein for automatic redialing and repeatedly redialing a stored telephone number at periodic intervals until either a ring signal is obtained from a called line corresponding the stored telephone number or a predetermined number of times of which the stored telephone number has been redialed at the periodic intervals.

2. Related Art

Conventional telephone systems are widely used to perform a memory dial function and a redial function. In the memory dial mode, telephone numbers of called subscribers are registered in a memory such as a random-access-memory (RAM) in terms of abbreviated telephone numbers of one or more digits as disclosed, for example, in U.S. Pat. No. 4,119,810 for Pushbutton Telephone Apparatus With Automatic Dialing And Combinational Sequential Control Signalling Capabilities issued to Marin et al., U.S. Pat. No. 5,182,769 for Telephone Set Having A Volatile Memory issued to Yamaguchi et al., U.S. Pat. No. 5,392,340 for Telephone Exchange Apparatus issued to Otsuka, U.S. Pat. No. 5,491,745 for Method And Apparatus For A Dual Mode Keypad Permitting One-Touch Telephone Number Dialing issued to Roeder, U.S. Pat. No. 5,568,546 for Method And Apparatus For Dynamic Abbreviated Dialing Assignment issued to Marutiak. When an abbreviated number of a designated called subscriber is dialed, the telephone number corresponding to the abbreviated number is read from the volatile memory and is sent to the telephone of the called subscriber.

In the redial mode, a last dialed telephone number is temporarily stored when a connection to a destination telephone system is not successful so that a caller may conveniently redial by simply depressing a redial button without inputting the entire digits of the telephone number of a called subscriber. Contemporary practice of automatic redialing of a stored telephone number is disclosed, for example, U.S. Pat. No. 4,324,954 for Dialing Circuits And Methods For Electronic Telephone Sets issued to Taylor, U.S. Pat. No. 5,243,646 for Fast Redial System For A Telephone issued to McCarthy, and U.S. Pat. No. 5,394,462 for Communication Apparatus Having A Redial Function And A Simplified-Dial-Number Registration Function issued to Maemura. The telephone number stored in the redial memory may also be automatically redialed for a long distance call such as disclosed in U.S. Pat. No. 5,268,959 for Telephone Long Distance Redialing Apparatus And Process issued to Hong.

One known problem with the redial feature of the conventional telephone system is that the telephone system is structured to generally store only the last dialed telephone number and the contents of the redial memory are disturbed by any subsequent telephone dialing. That is, if the caller places a call to another subscriber after an unsuccessful call to a desired subscriber, the caller cannot use a redial function to place a call to the desired subscriber after calling the other subscriber. In this situation, the caller must again input the entire telephone number of the desired subscriber. One conventional redial arrangement that seeks not to disturb the contents of the redial memory is disclosed, for example, in U.S. Pat. No. 4,508,939 for Last Number Redial Device issued to Lawson et al. Other known redial arrangements that seek to overcome the above problem are disclosed, for example, in U.S. Pat. No. 4,602,128 for Automatic Redialing Arrangement For Multi-Line Telephone Station Sets issued to Freundlich, U.S. Pat. No. 4,930,155 for Multiple Redialing System issued to Kurokawa, and U.S. Pat. No. 5,136,637 for Method And Apparatus For Automatic Redialing Of Telephone Numbers issued to Rust et al. In Rust '637 and Kurokawa '155, for example, a directory of telephone numbers to be redialed is retained and is visually provided for the caller's selection.

Another problem with the redial feature of the conventional telephone system is that a redial capability requires the caller to manually go "on" hook and then "off" hook in order to use the redial function if the stored telephone number automatically redialed is busy and the call cannot be completed. One known solution to this problem is disclosed in U.S. Pat. No. 4,887,294 for Telephone Automatic Redial System issued to Ruey-Guang. In Ruey-Guang '294, for example, digital integrated circuits are installed along with switches including a redial initiation circuit for initiating an automatic redial of a stored telephone number contained in a redial memory in response to a dial tone from a called line, and a redial interrupt circuit for interrupting a redial sequence in response to a busy tone from the called line. Redial interrupt circuit of Ruey-Guang '294 is constructed of a series of CMOS logic gates along with a timer for temporarily interrupting the dialing sequence for predetermined periods of time and a counter for interrupting the redialing sequence after a stored telephone number has been redialed a predetermined number of times. While the redialing sequence of Ruey-Guang '294 can be carried out and repeated automatically when the caller closes automatic redial switch and decoder switch in order to eliminate the need for the caller to manually go "on" hook and "off" hook, the hardware requirement, I have observed, is cumbersome and cost prohibitive. More particularly, the hardware construction of Ruey-Guang '294 is not suitable for modem telephone switching system such as private automatic branch exchange (PABX) system in which a central switching unit controls operation of individualized extension telephone sets connected thereto. Accordingly, I believe that a simple and cost effective redialing method of a telephone switching system in terms of software can be contemplated for effectively enabling the calling subscriber to reliably redial a stored telephone number, and if the called line of the stored telephone number is busy, to automatically redial the same telephone number at fixed intervals at least until a ring tone is obtained from the called line or until after the telephone number has been redialed a predetermined number of times.

SUMMARY OF THE INVENTION

Accordingly, it is therefore an objective of the present invention to provide a telephone switching system having a simple redialing control process incorporated therein for serving a plurality of individualized subscriber telephone sets connected thereto.

It is also an object to provide a private automatic branch exchange (PABX) system having an automatic redialing and repeated redialing software routine incorporated in a central processing unit (CPU) for serving a plurality of individualized subscriber telephone sets connected thereto.

It is further an object to provide a telephone switching system capable of enabling individualized subscriber phone set to dial a stored telephone number, and if a called line of the stored telephone number is busy, to automatically redial the same telephone number at fixed intervals until a ring tone is obtained from the called line of the stored telephone number or until after the telephone number has been redialed a predetermined number of times even when a telephone handset of the subscriber phone set of a calling subscriber remains "on" hook.

These and other objects of the present invention can be achieved by a telephone switching system which comprises a central switching unit connected between telephone lines and a plurality of subscriber terminals, each terminal including a handset, a plurality of alphanumeric keys for inputting a telephone number of a called subscriber and at least a redial key for automatic redialing operation. Central switching unit includes a memory comprising a dial buffer and a redial buffer for storing the input telephone number of the called subscriber for dialing and redialing operations, and a controller for controlling the dialing of the input telephone number and the automatic redialing of the input telephone number when a called line is busy by storing the input telephone number of the called subscriber in the dial buffer and the redial buffer after the telephone number is input by a calling subscriber, and dialing the input telephone number stored in the dial buffer; after the input telephone number stored in said dial buffer is dialed, determining whether the called line corresponding to the input telephone number is busy; when the called line corresponding to the input telephone number is busy, determining whether the redial key is depressed by the calling subscriber; when the redial key is depressed by the calling subscriber, setting an automatic redial flag indicating a predetermined number of times for redialing the input telephone number stored in the redial buffer at fixed intervals; and automatically redialing the input telephone number stored in the redial buffer at least until the called line corresponding to the input telephone number is idle or until after the telephone number has been redialed at fixed intervals for the predetermined number of times set by the automatic redial flag.

The present invention is more specifically described in the following paragraphs by reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
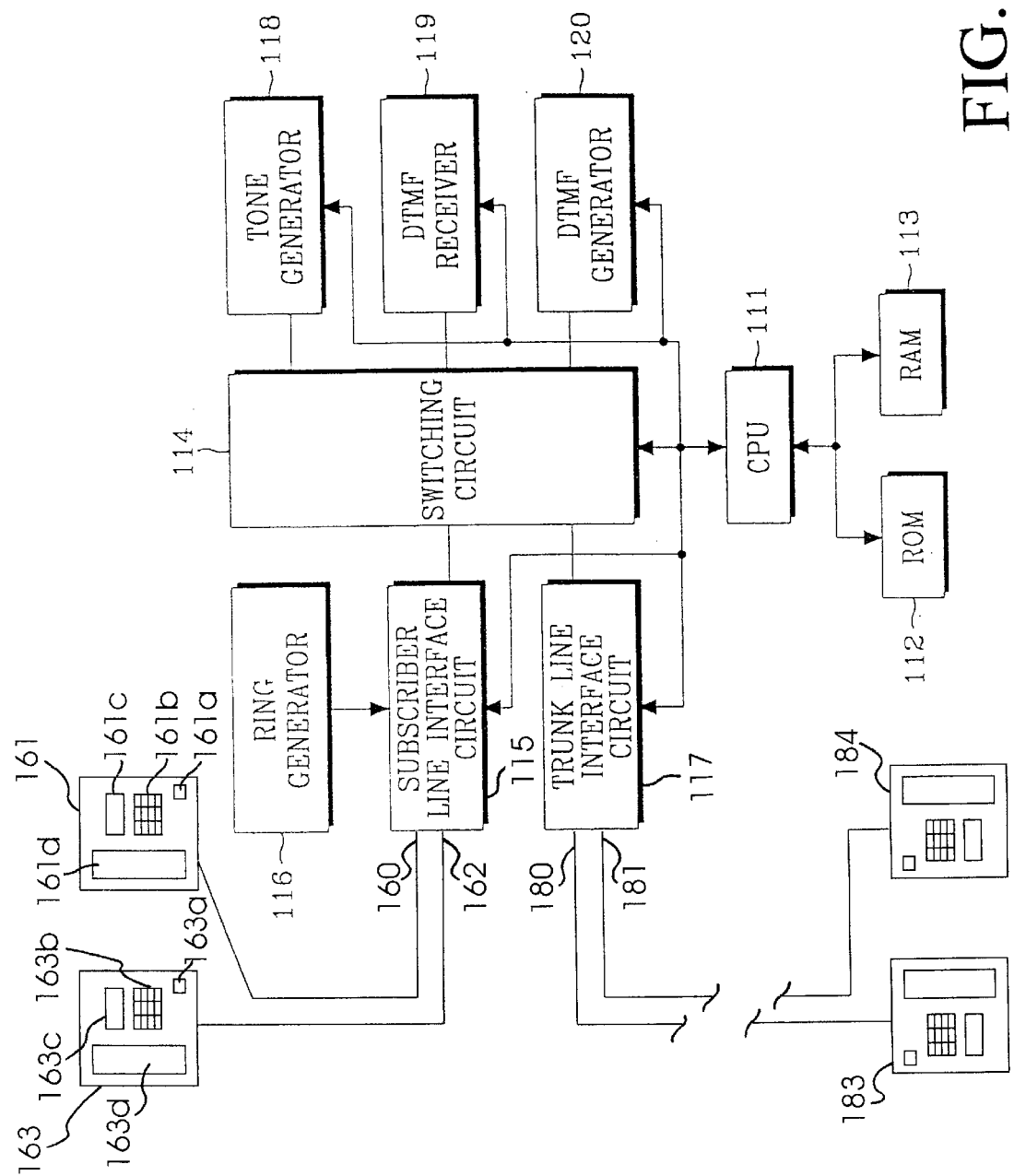
FIG. 1 illustrates a telephone switching system constructed according to the principles of the present invention.

Referring now to the drawings and particularly to FIG. 1, which illustrates a telephone switching system such as a private automatic branch exchange (PABX) system constructed according to the principles of the present invention. The telephone switching system includes a central processing unit (CPU) 111 for controlling general operations of the telephone switching system, such as call switching and providing a variety of services for users, a read-only-memory (ROM) 112 for storing therein an operating program and initial service data needed by CPU 111 to perform basic call and a variety of other functions, and a random-access-memory (RAM) 113 for temporarily storing data generated during the execution of the program under the control of CPU 111.

A switching circuit 114 switches a variety of tones and voice data under the control of CPU 111. A subscriber line interface circuit 115 supplies the signal current to the individualized subscriber telephone sets, and interfaces the subscriber telephone sets with the switching circuit 114 under the control of CPU 111. Each subscriber telephone set has a handset, and a plurality of discrete keys including a plurality of alphanumeric keys for inputting a telephone number for dial operation and at least a redial key for requesting automatic redialing operation. A ring generator 116 generates and sends a ring tone to a subscriber line. A trunk line interface circuit 117 seizes an office line and thereby forms an office line call loop under the control of CPU 111, and interfaces the office line with switching circuit 114. The office line can be connected to either port 180 or port 181. A tone generator 118 generates a variety of tone signals, transmitting them to switching circuit 114 under the control of CPU 111. A dual tone multi-frequency (DTMF) receiver 119 analyzes DTMF signals received through the switching circuit 114, and converts the same into digital data before transmission to CPU 111. The DTMF signals, which are received by DTMF receiver 119 at the switching circuit 114, represent telephone numbers which are generated by the office line subscribers or extension subscriber. A DTMF generator 120 converts the digital data, which is output by CPU 111, into the DTMF signals before transmitting the same to the switching circuit 114. The DTMF signals, which are output by the DTMF generator 120, are the office line subscriber's telephone number entered while dialing out from extension line to office line. The trunk line interface circuit 117 is connected to the switching circuit 114 and is also connected to first ports 180 and 181. The first ports 180 and 181 are connected to telephone lines. Telephone 183 and telephone 184 are connected to the telephone lines. The subscriber line interface circuit 115 is connected to the switching circuit 114 and is also connected to second ports 160 and 162. The second ports 160 and 162 are connected to subscriber phone terminals 161 and 163, respectively. Subscriber phone terminal 161 includes a redial key 161a, alphanumeric keys 161b, a display 161c, and a hand set 161d. Subscriber phone terminal 163 includes a redial key 163a, alphanumeric keys 163b, a display 163c, and a handset 163d.

Figure 2:
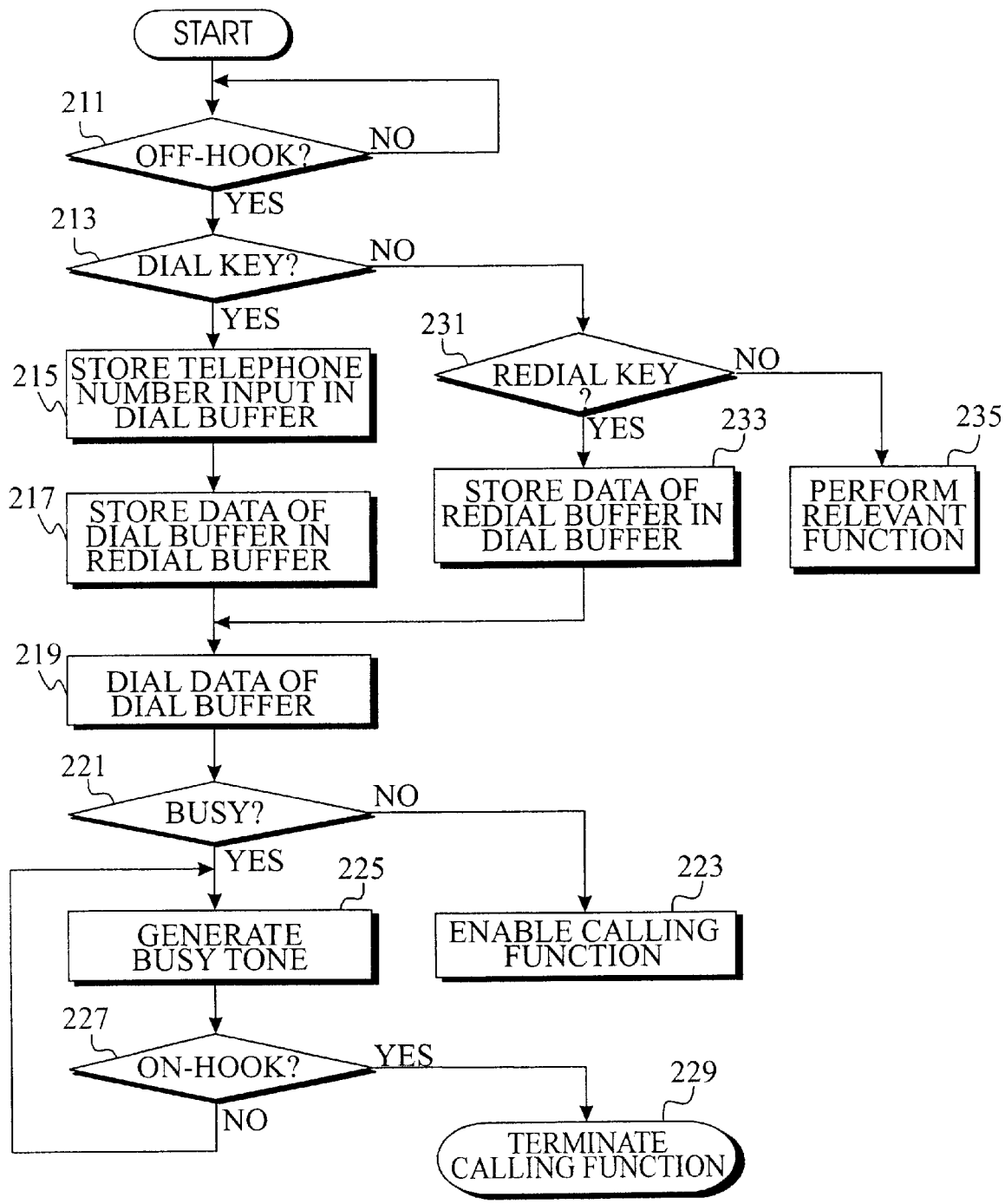
FIG. 2 illustrates a flow chart of a contemporary process of automatically redialing a stored telephone number for use in the telephone switching system.

FIG. 2 is a flow chart of a contemporary process of automatically redialing a stored telephone number for use in the telephone switching system. Generally, the CPU 111 checks ports of the subscriber line interface circuit 115 in order to determine whether a subscriber phone is "off" hook. If any subscribers port goes "off" hook, CPU 111 detects this at step 211 in order to control the switching circuit 114 to connect the tone generator 118 to the relevant subscriber, through the subscriber line interface circuit 115, for the purpose of providing a dial tone to the subscriber while connecting the relevant subscriber, through the subscriber line interface circuit 115, to the DTMF receiver 119 for the purpose of forming a receipt path for dialing data. CPU 111 receives and analyzes the data which is generated by the DTMF receiver 119.

When data received from subscriber line interface circuit 115 represents a called subscriber's telephone number, CPU 111 senses this at step 213, and stores the received telephone number in a dial buffer of a call control block at step 215. The dial buffer, which is an allotted region of RAM 113, stores the telephone numbers consisting of sixteen-character or smaller strings. When the storing of the called subscriber's telephone number in the dial buffer is completed, CPU 111 copies the telephone number from the dial buffer to a redial buffer at step 217. The redial buffer, which is also an allotted region of RAM 113, stores the telephone number which will be sent when receiving the signal indicating that the redial key is input.

When input of the telephone number is completed, CPU 111 transmits the telephone number, which is stored in the dial buffer, to the DTMF generator 120. That is to say, CPU 111 performs the dialing function in accordance with the telephone number which was input therein. CPU 111 checks the status of a called subscriber line at step 221. If the called line is idle, CPU 111 provides the calling subscriber with a ring tone at step 223 forming a speech path in order to perform the call function when the called subscriber answers.

When the called line is busy at step 221, CPU 111 produces a busy tone until the relevant subscriber is "on" hook at step 225. If the called line is busy when an outgoing call from a calling subscriber is initiated, the calling subscriber returns "on" hook to complete the call, and then goes "off" hook again before pressing the redial key. CPU 111 senses the input of the redial key, through the DTMF receiver 119 at step 231, and copies the telephone number from the redial buffer to the dial buffer at step 233, before executing the dialing operation at step 219. The subsequent operation is the same as described above.

Contemporary redialing technique for use in telephone switching systems, as I have described however, requires the calling subscriber to manually go "on" hook and then "off" hook if the stored telephone number automatically redialed is busy and the call cannot be completed. That is, when the calling subscriber picks his or her telephone handset "off" hook to perform dialing operation, and the called line is busy, the calling subscriber must return his handset "on" hook, and then go "off" hook before pressing a redial key. If the called line is still busy during redialing operation via redial key, the calling subscriber must repeat the "on" and "off" hook operation which can be very bothersome and inconvenient for telephone switching systems.

Figure 3A:
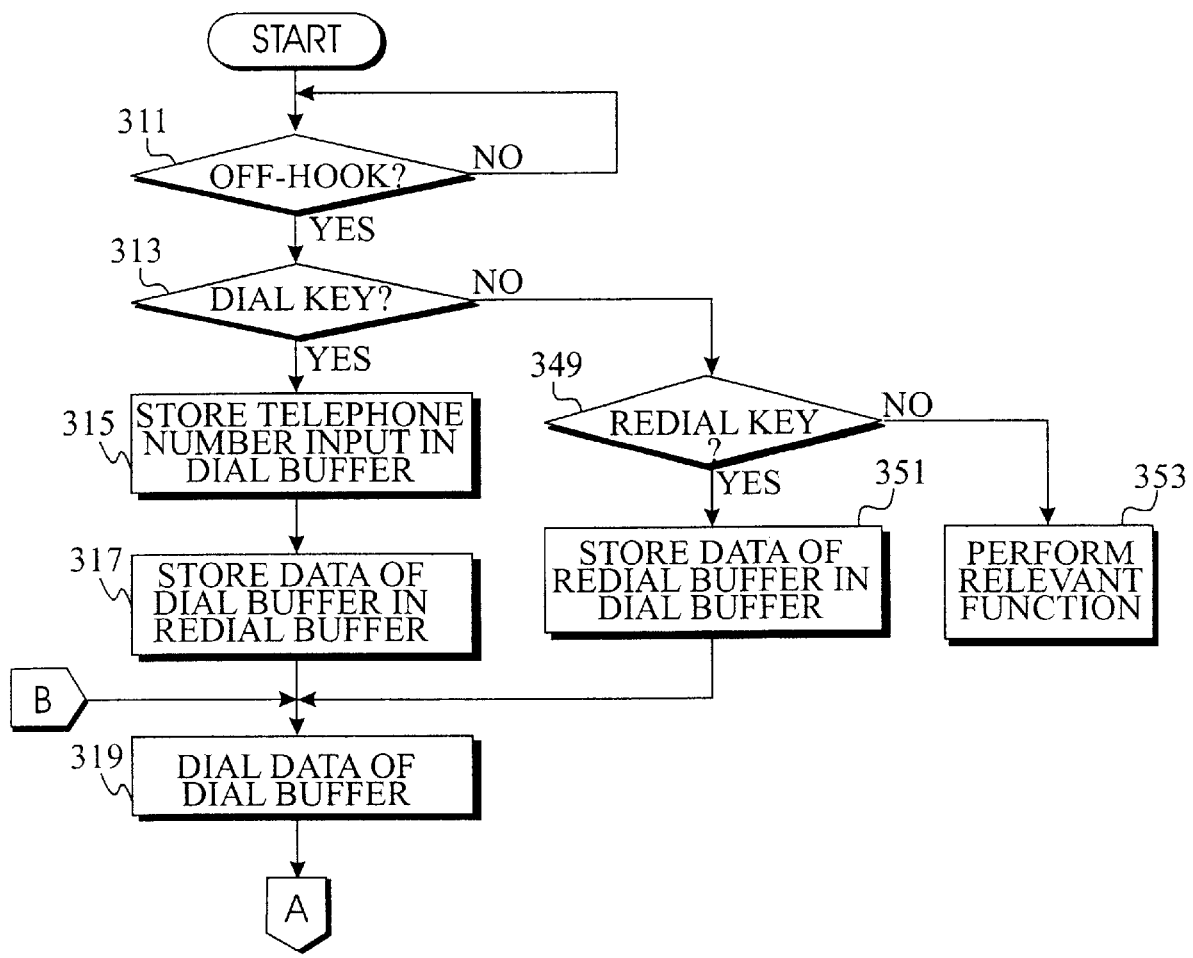
FIGS. 3A and 3B illustrate a flow chart of an automatic redialing and repeated redialing software process as incorporated in a central processing unit (CPU) of the telephone switching system serving a plurality of individualized subscriber telephone sets connected thereto for enabling individualized subscriber telephone set to redial a stored telephone number, and if a called line of the stored telephone number is busy, to automatically redial the same telephone number at fixed intervals until a ring tone is obtained from the called line of the stored telephone number or until after the telephone number has been redialed a predetermined number of times even when a telephone handset is "on" hook according to a preferred embodiment of the present invention.
Figure 3B:
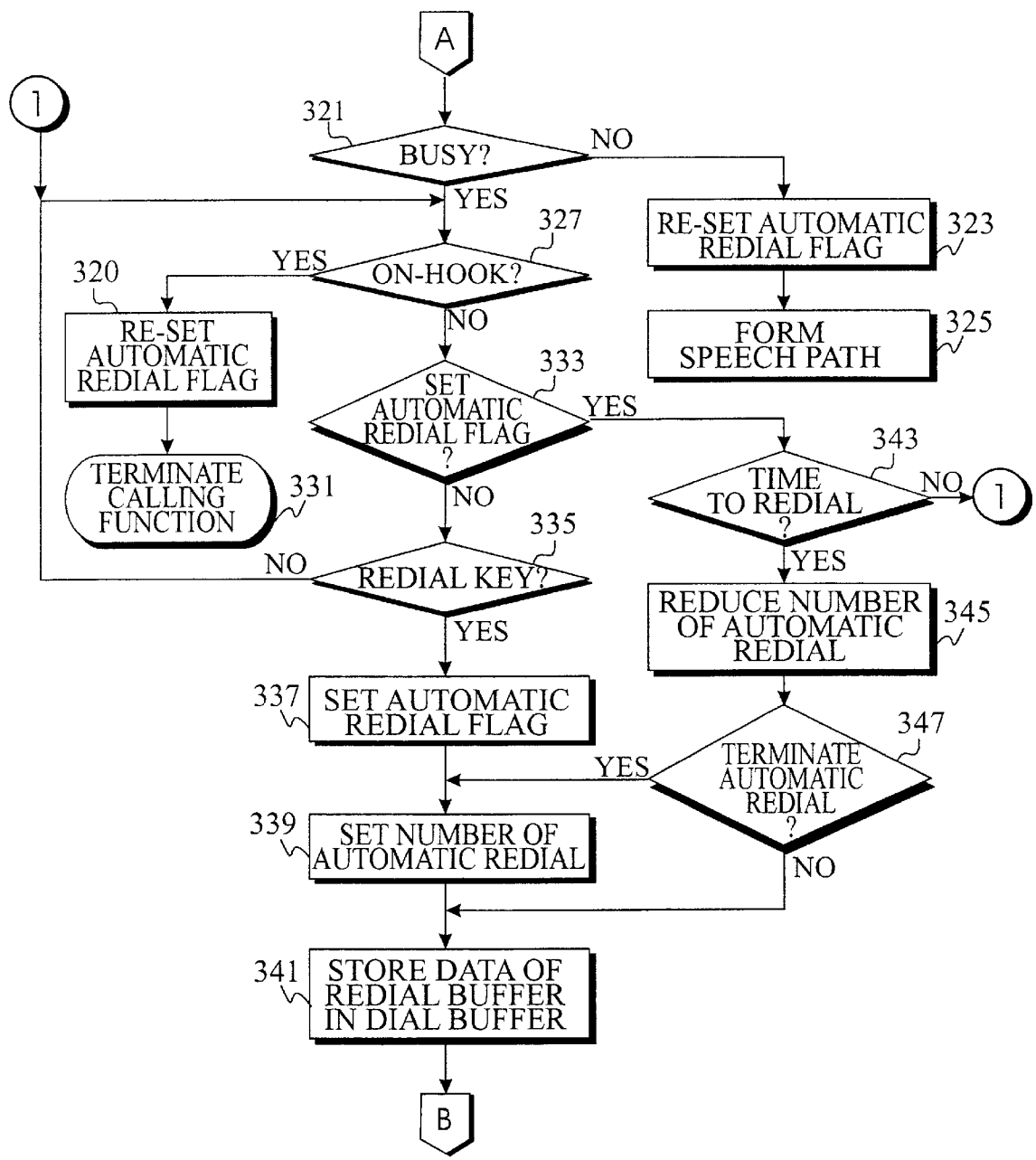

Turning now to FIGS. 3A and 3B which are an automatic redialing and repeated redialing software process as incorporated in a central processing unit (CPU) 111 of the telephone switching system as shown in FIG. 1 serving a plurality of individualized subscriber telephone sets connected thereto for enabling individualized subscriber phone set to redial a stored telephone number, and if a called line of the stored telephone number is busy, to automatically redial the same telephone number at fixed intervals until a ring tone is obtained from the called line of the stored telephone number or until after the telephone number has been redialed a predetermined number of times even when a telephone handset of a calling subscriber is "on" hook according to a preferred embodiment of the present invention.

The RAM 113 of the telephone switching system is modified in accordance with the preferred embodiment of the present invention to include a call control block, a redial buffer, and an automatic redial counter. The call control block includes a dial buffer, which stores maximum sixteen-character telephone number in needed to dial, and an automatic redial flag for providing a visual indication of whether the automatic redial function is performed. The dial buffer can store sixteen-character telephone numbers. The automatic redial flag indicates whether the automatic redial function is performed. The automatic redial flag is set when the function is performed, and re-set when the call is terminated or the call function is performed. An automatic redial counter is specified in second in order to repeatedly redial the same telephone number if the called line is busy. When the counter times out, it is re-set ready for a new redial function.

As shown in FIG. 3, CPU 111 checks ports of the subscriber line interface circuit 115 in order to determine whether which corresponding subscribers are "off" hook. If any subscriber's port goes "off" hook, CPU 111 detects this at step 311 for controlling the switching circuit 114, and connecting tone generator 118 to the relevant subscriber through the subscriber line interface circuit 115, for the purpose of providing a dial tone for the subscriber, and connecting the relevant subscriber, using the subscriber line interface circuit 115 to the DTMF receiver 119, for the purpose of forming a communication path corresponding to the dialing data. CPU 111 receives and analyzes the data output from DTMF receiver 119.

When data received from subscriber line interface circuit 115 represents the called subscriber's telephone number, CPU 111 detects this at step 313, and stores the telephone number in the dial buffer. After the telephone number is stored in dial buffer at step 313, CPU 111 copies the telephone number, which was stored in the dial buffer, to a redial buffer at step 317. The redial buffer, which is an allotted region of RAM 113, stores the telephone number which will be resent when the signal from the redial key is received.

When input of the telephone number is completed, CPU 111 reads the telephone number, which is stored in the dial buffer, and transmits the same to DTMF generator 120. Accordingly, the telephone number is converted into DTMF signals by means of the DTMF generator 120. CPU 111 determines the status of the called subscriber at step 321. If the called line is idle, CPU 111 re-sets an automatic redial flag in the call control block in order to remove the automatic redial function at step 323. Additionally, CPU 111 transmits a ring back tone to the subscriber at step 325 for controlling the switching circuit 114 in order to form a speech path between the ports of the calling subscriber and called subscriber when the called subscriber answers.

When the called line is busy at step 331, however, CPU 111 controls switching circuit 114 to transmit a busy tone for the relevant subscriber. If the calling subscriber presses the redial key, after receiving the busy tone, CPU 111 detects this at step 335, sets the automatic redial flag of the call control block, for the purpose of setting up the automatic redial function, at the step 337. Then the CPU 111 sets the number of the automatic redial to the automatic redial counter at step 339, copies the telephone number, stored in the redial buffer, to the dial buffer at step 341, and then transmits the telephone number stored in the dial buffer, to the DTMF generator 120 in order to perform the redial operation at step 319. In other words, upon receipt of a signal indicating that the redial key has been pressed while the called line is busy, CPU 111 continuously performs the operation of steps 337 through 341 to set up and perform the automatic redial function.

After the redial operation, CPU 111 checks the status of the called subscriber again. When the called line is busy and the calling subscriber remains off-hook, CPU 111 senses that the automatic redial flag is set at step 333, and checks the time to redial using an internal timer at step 343. When the automatic redial function is set, CPU 111 repeatedly performs the redial operation at the time fixed in the internal timer.

When it is time to redial, CPU 111 senses this at step 343, reduces the value of the automatic redial counter at step 345, and then checks whether the number of redial occurs at the fixed intervals at step 347. When there is a remaining number of redial, CPU 111 copies the telephone number stored in the redial buffer, to the dial buffer at step 341 before performing the dialing operation at step 319.

While the redial operation is repeatedly performed when the called line is busy and the calling subscriber remains "off" hook, the number of redial, as established by the automatic redial counter, decreases to terminate redial operation. CPU 111 detects this at step 347, and proceeds to step 339 to re-set the number variable established in the automatic redial counter again, thereby performing the automatic repeated redial operation described above.

If the redial operation is performed, and the busy line returns "on" hook, CPU 111 senses this at step 321, and re-sets the automatic redial flag of the call control block in order to discontinue the automatic redial operation at step 323. CPU 111 provides the calling subscriber with a ring tone informing the caller that the called subscriber is called, at step 325. CPU 111 controls the switching circuit 114 to form a speech path between the ports of the calling subscriber and called subscriber when the called subscriber answers.

As the dialing data is transferred when the calling subscriber is "on" hook, CPU 111 senses this at step 327, re-sets the automatic redial flag in the call control block in order to discontinue the automatic redial function at step 329, and then performs the call termination function at step 331.

When the calling subscriber goes from "on" hook to "off" hook and presses the redial key, CPU 111 senses, at step 349, the input of the redial key, through the DTMF receiver 119, and copies the telephone number stored in the redial buffer, to the dial buffer, at step 233, before performing the dialing operation at step 319. The subsequent operation is the same as mentioned above.

As described above, an automatic redial method of a telephone switching system such as a private automatic branch exchange (PABX) system according to the preferred embodiment of the present invention, is performed by generating the signal of the redial key while the called line is busy. If the signal of the redial key is received while the called line is busy, the automatic redial flag is re-set by the key phone switching system, and the automatic redial operation is performed within the time established, and if the called subscriber answers, the automatic redial flag is re-set before the calling operation is performed. During the redial operation, if the calling subscriber is on-hook, the automatic redial flag is re-set and then the call termination operation is performed. Accordingly, using the automatic redial method of the telephone switching system in accordance with the preferred embodiment of the present invention, when the called line is busy, the automatic dialing operation is performed to provide call function until the called line is idle.

While there have been illustrated and described what are considered to be preferred embodiments of the present invention, it will be understood by those skilled in the art that various changes and modifications may be made, and equivalents may be substituted for elements thereof without departing from the true scope of the present invention. For instance, a universal long distance prefix in the form of the numeral "1" before a last number dialed memory recorded number may be incorporated into the telephone switching system constructed according to the principles of the present invention so that the telephone number stored in the redial memory may be automatically redialed for a long distance call. Similarly, while the telephone switching system as contemplated by the present invention is structured to store only the last dialed telephone number for redialing purposes, a directory of telephone numbers to be redialed may be incorporated and retained for the purposes of providing a visual display of all previously dialed telephone numbers for the caller's selection. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A redial method for a telephone switching system including a memory comprising a dial buffer and a redial buffer, said redial method comprising the steps of:

storing a telephone number of a called subscriber in said dial buffer and said redial buffer after the telephone number is input to a subscriber telephone by a calling subscriber, and dialing the input telephone number stored in said dial buffer, said subscriber telephone being connected to said telephone switching system, the input telephone number corresponding to a called line;

when a redial key on said subscriber telephone is depressed, setting an automatic redial flag indicating a predetermined number of times for redialing the input telephone number stored in said redial buffer at fixed intervals; and automatically redialing the input telephone number stored in said redial buffer at least until one event occurs selected from a first event corresponding to the called line being idle and a second event corresponding to the telephone number being redialed at fixed intervals for said predetermined number of times set by said automatic redial flag, said telephone switching system being a private automatic branch exchange (PABX) system comprising a central switching unit having first ports coupled to telephone lines and second ports coupled to a plurality of subscriber phone terminals, each subscriber phone terminal including a handset, a plurality of alphanumeric keys for inputting the telephone number of the called subscriber and a redial key for redialing operation.

2. The method of claim 1, further comprising the step of re-setting the automatic redial flag before storing a second telephone number in said dial buffer and said redial buffer, when the first event occurs.

3. The method of claim 2, said central switching unit further comprising a controller controlling the dialing of the input telephone number and the automatic redialing of the input telephone number when the called line is busy.

4. The method of claim 2, the telephone number corresponding to a first telephone number, the called subscriber corresponding to a first called subscriber, the second telephone number corresponding to a second called subscriber.

5. The method of claim 4, further comprising a central processing unit controlling general operations of said telephone switching system including call switching to switch telephone connections among said calling subscriber, said first called subscriber, and said second called subscriber.

6. The method of claim 4, said first telephone number not corresponding to said second telephone number and said first called subscriber not corresponding to said second called subscriber.

7. The method of claim 6, further comprising a central processing unit controlling general operations of said telephone switching system including call switching to switch telephone connections among said calling subscriber, said first called subscriber, and said second called subscriber.

8. The method of claim 1, said central switching unit including said memory comprising said dial buffer and said redial buffer.

9. The method of claim 1, said central switching unit further comprising a controller controlling the dialing of the input telephone number and the automatic redialing of the input telephone number when the called line is busy.

10. The method of claim 1, further comprising the steps of:

when the input telephone number stored in said dial buffer is dialed, determining whether the called line is busy; and when the called line is busy, determining whether said redial key on said subscriber telephone is depressed.

11. A redial method for a telephone switching system including a memory comprising a dial buffer and a redial buffer, said redial method comprising the steps of:

storing a telephone number of a called subscriber in said dial buffer and said redial buffer after the telephone number is input to a subscriber telephone by a calling subscriber, and dialing the input telephone number stored in said dial buffer, said subscriber telephone being connected to said telephone switching system, the input telephone number corresponding to a called line;

when a redial key on said subscriber telephone is depressed, setting an automatic redial flag indicating a predetermined number of times for redialing the input telephone number stored in said redial buffer at fixed intervals; and automatically redialing the input telephone number stored in said redial buffer at least until one event occurs selected from a first event corresponding to the input telephone number being idle and a second event corresponding to the telephone number being redialed at fixed intervals for said predetermined number of times set by said automatic redial flag, said telephone switching system being a private automatic branch exchange (PABX) system comprising a central switching unit having first ports coupled to telephone lines and second ports coupled to a plurality of subscriber phone terminals, each subscriber phone terminal including a handset, a plurality of alphanumeric keys for inputting the telephone number of the called subscriber and a redial key for redialing operation, said telephone switching system corresponding to a private automatic branch exchange (PABX) system comprising:

a central switching unit having first ports coupled to telephone lines and second ports coupled to a plurality of subscriber phone terminals, each subscriber phone terminal including a handset, a plurality of alphanumeric keys for inputting the telephone number of the called subscriber and a redial key for redialing operation; and said central switching unit including a memory comprising said dial buffer and said redial buffer for storing the input telephone number of the called subscriber for dialing and redialing operations, and a controller for controlling the dialing of the input telephone number and the automatic redialing of the input telephone number when the called line is busy.

12. A private automatic branch exchange (PABX) system, comprising:

a central switching unit having a plurality of first ports coupled to telephone lines and a plurality of second ports coupled to a plurality of subscriber terminals, each subscriber terminal including a handset, a display unit, a plurality of alphanumeric keys for inputting a telephone number of a called subscriber and at least a redial key for automatic redialing operation; and said central switching unit including a memory comprising a dial buffer and a redial buffer for storing the input telephone number of the called subscriber for dialing and redialing operations, and a controller for controlling the dialing of the input telephone number and the automatic redialing of the input telephone number when a called line is busy by:

storing the input telephone number of the called subscriber in said dial buffer and said redial buffer after the telephone number is input by a calling subscriber, and dialing the input telephone number stored in said dial buffer;

after the input telephone number stored in said dial buffer is dialed, determining whether the called line corresponding to the input telephone number is busy;

when the called line corresponding to the input telephone number is busy, determining whether said redial key is depressed;

when the redial key is depressed by the calling subscriber, setting an automatic redial flag indicating a predetermined number of times for redialing the input telephone number stored in said redial buffer at fixed intervals; and automatically redialing the input telephone number stored in said redial buffer at least until the called line corresponding to the input telephone number is idle or until after the telephone number has been redialed at fixed intervals for said predetermined number of times set by said automatic redial flag.

13. The private automatic branch exchange (PABX) system of claim 12, said controller re-setting the automatic redial flag before storing a second telephone number in said dial buffer and said redial buffer, when the called line is idle during the redialing operation.

14. The private automatic branch exchange of claim 13, said memory corresponding to a random access memory.

15. The private automatic branch exchange of claim 13, further comprising a tone generator coupled to said central switching unit, said tone generator generating tones corresponding to the input telephone number of the called subscriber.

16. The private automatic branch exchange of claim 15, said tone generator corresponding to a dual tone multifrequency tone generator.

17. The private automatic branch exchange of claim 12, said memory corresponding to a random access memory.

18. The private automatic branch exchange of claim 12, further comprising a tone generator coupled to said central switching unit, said tone generator generating tones corresponding to the input telephone number of the called subscriber.

19. The private automatic branch exchange of claim 18, said tone generator corresponding to a dual tone multifrequency tone generator.

* * * * *